(12) United States Patent
Kwon et al.

(10) Patent No.: US 9,350,500 B2
(45) Date of Patent: May 24, 2016

(54) APPARATUS AND METHOD FOR TRANSMITTING AND RECEIVING STREAMING DATA USING MULTIPLE PATHS

(75) Inventors: Hyoung Jin Kwon, Daejeon (KR); Jin Kyeong Kim, Daejeon (KR); Woo Yong Lee, Daejeon (KR); Kyeongpyo Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 868 days.

(21) Appl. No.: 12/747,138

(22) PCT Filed: Dec. 10, 2008

(86) PCT No.: PCT/KR2008/007309
§ 371 (c)(1),
(2), (4) Date: Jun. 9, 2010

(87) PCT Pub. No.: WO2009/075522
PCT Pub. Date: Jun. 18, 2009

(65) Prior Publication Data
US 2010/0325301 A1   Dec. 23, 2010

(30) Foreign Application Priority Data
Dec. 10, 2007 (KR) ........................ 10-2007-0127385

(51) Int. Cl.
*G06F 15/16* (2006.01)
*H04L 5/00* (2006.01)
*H04L 1/06* (2006.01)
*H04L 29/06* (2006.01)

(52) U.S. Cl.
CPC .. *H04L 5/00* (2013.01); *H04L 1/06* (2013.01); *H04L 65/4069* (2013.01)

(58) Field of Classification Search
CPC ......... H04L 1/06; H04L 65/4069; H04L 5/00; G06F 15/16
USPC .......................... 709/231, 238, 239, 240, 241
See application file for complete search history.

(56) References Cited

U.S. PATENT DOCUMENTS 6,968,309 B1 * 11/2005 Makinen et al. .............. 704/219
7,117,423 B2   10/2006 Kim et al.
(Continued)

FOREIGN PATENT DOCUMENTS

JP   2000-299704 A   10/2000
KR   2004-0063899 A   7/2004
(Continued)

*Primary Examiner* — Cheikh Ndiaye
(74) *Attorney, Agent, or Firm* — Rabin & Berdo, P.C.

(57) ABSTRACT

The present invention relates to an apparatus and method for transmitting/receiving streaming data using multiple paths, in which the streaming data is smoothly reproduced without being interrupted, and more particularly, to an apparatus and method for transmitting/receiving streaming data using multiple paths, in which exchange of the streaming data is performed in real-time using the multiple paths regardless of obstacles. The method for transmitting streaming data using multiple paths includes managing and maintaining a path list including sequence information about a transmission path capable of transmitting data, framing the streaming data, and transmitting the framed streaming data via the transmission path according to the sequence information.

13 Claims, 5 Drawing Sheets

(56) References Cited

U.S. PATENT DOCUMENTS

| | | |
|---|---|---|
| 7,260,102 B2 | 8/2007 | Mehrvar et al. |
| 2003/0076891 A1* | 4/2003 | Won .............................. 375/267 |
| 2003/0128769 A1* | 7/2003 | Kim et al. ..................... 375/265 |
| 2003/0188251 A1* | 10/2003 | Brown et al. ................. 714/763 |
| 2003/0229822 A1* | 12/2003 | Kim et al. ....................... 714/18 |
| 2005/0157806 A1* | 7/2005 | Walton et al. ................ 375/267 |
| 2005/0259627 A1* | 11/2005 | Song et al. .................... 370/342 |
| 2006/0209667 A1* | 9/2006 | Li ................................. 370/203 |
| 2007/0072604 A1* | 3/2007 | Wang ............................ 455/428 |

FOREIGN PATENT DOCUMENTS

| | | |
|---|---|---|
| KR | 10-2007-0054969 A | 5/2007 |
| KR | 2007-0104797 A | 10/2007 |

\* cited by examiner

APPARATUS AND METHOD FOR TRANSMITTING AND RECEIVING STREAMING DATA USING MULTIPLE PATHS

TECHNICAL FIELD

The present invention relates to an apparatus and method for transmitting/receiving streaming data in which the streaming data is smoothly reproduced without being interrupted, and more particularly, to an apparatus and method for transmitting/receiving streaming data in which exchange of the streaming data is performed in real-time regardless of obstacles using multiple path.

This work was supported by the IT R&D program of MIC/IITA. [2007-S-002-01, Development of Multi-Gigabit Air Interface Technology]

BACKGROUND ART

In radio communication systems in a band of 60 GHz using directional antennas instead of omni antennas in terms of channel characteristics, there frequently arises a problem in that communications failure occurs due to considerable deterioration of the channel state of a path presently used, when the channel is interrupted by people or obstacles. The communications failure may be immediately solved when the people or the obstacles are eliminated. However, since data exchange is performed with a relatively high speed of about 3 Gbps in the radio communication system in the 60 GHz band, communication failures occurring even for a considerably short time may cause serious problems.

In particular, in a case where a large volume of streaming data is processed in real-time as in real time video streaming data services, discontinuous video is generated even by a communications failure occurring for a very short time, thereby causing dissatisfaction among viewers.

In order to overcome the above-mentioned communications failure, according to the conventional art, diversity technologies using multiple paths have been suggested. However, the diversity technologies may encounter difficulties in overcoming the communications failure because communication using a Line Of Sight (LOS) as in the 60 GHz may not have significant effects obtained by means of the multiple paths.

Also, in order to overcome the problems of the diversity technologies using multiple paths, a path diversity technology that may employ different paths for each of multiple antennas using the multiple antennas has been suggested The above-mentioned conventional technologies using the multiple paths may determine whether the path is interrupted based on data receiving-acknowledgement control signals.

However, disadvantageously, the data transmitting/receiving method using the conventional multiple paths may not be applicable in a system requiring high speed real-time processing, which does not even have time needed to receive the data receiving-acknowledgement control signals, or in an open-loop-system that does not have feedback information such as acknowledgement signals.

DISCLOSURE OF INVENTION

Technical Problem

An aspect of the present invention provides an apparatus and method for transmitting/receiving streaming data using multiple paths, which may, via the multiple paths, prevent real-time streaming data exchange from being discontinued even though people or obstacles exist in a Light Of Sight (LOS).

An aspect of the present invention provides an apparatus and method for transmitting/receiving streaming data using multiple paths, which may reproduce the streaming data while preventing the streaming data from being interrupted without separate control signals even in the radio communication system using the directional antenna.

An aspect of the present invention provides an apparatus and method for transmitting/receiving streaming data using multiple paths, which may restore even corrupted streaming data at the time of exchange of the streaming data via the multiple paths.

Technical Solution

According to an aspect of the present invention, there is a method for transmitting streaming data using multiple paths, the method including: managing and maintaining a path list including sequence information about a transmission path capable of transmitting data; framing the streaming data; and transmitting the framed streaming data via the transmission path according to the sequence information.

According to an aspect of the present invention, there is a method for receiving streaming data using multiple paths, the method including: receiving a streaming data frame, and collecting the streaming data from the received streaming data frame; generating verification information obtained by verifying the collected streaming data, and determining whether streaming data is corrupted; and restoring the streaming data based on the verification information.

According to an aspect of the present invention, there is an apparatus for transmitting/receiving streaming data using multiple paths, the apparatus including: a path managing module to manage and maintain a path list including sequence information about a transmission path capable of transmitting data; a data transmitting module to frame the streaming data including the sequence information, and transmit the framed streaming data via a predetermined antenna; a data receiving module to receive the streaming data from metadata information included in a streaming data frame; a data verifying module to verify whether the streaming data is correctly received and whether the streaming data is corrupted, and generate verification information; and a restoring module to restore the streaming data based on the verification information.

MODE FOR THE INVENTION

Figure 1:
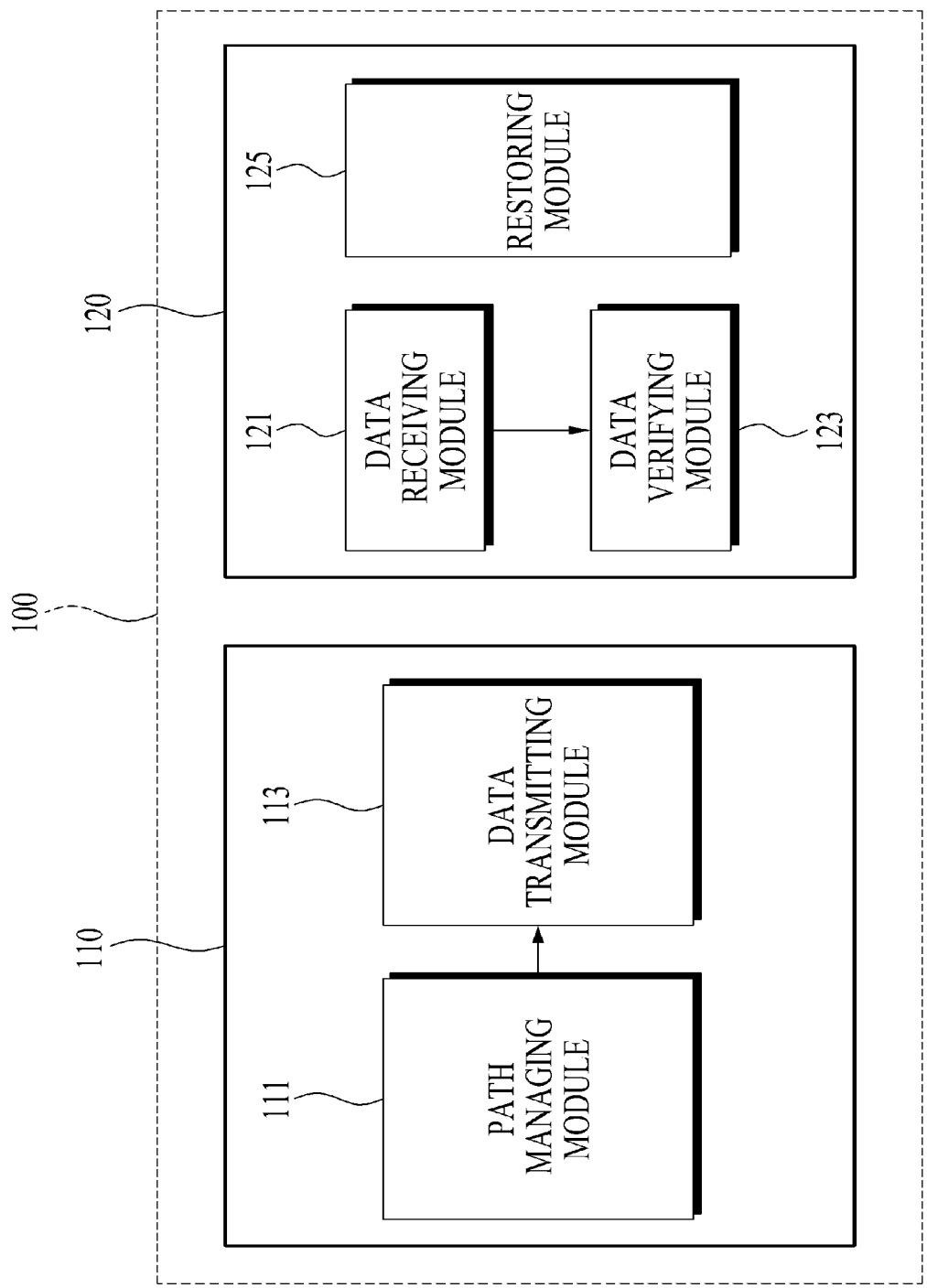
FIG. 1 is a block diagram illustrating a configuration of an apparatus for transmitting/receiving streaming data using multiple paths according to an exemplary embodiment of the invention.

Reference will now be made in detail to embodiments of the present invention, examples of which are illustrated in the accompanying drawings, wherein like reference numerals refer to the like elements throughout. The embodiments are described below in order to explain the present invention by referring to the figures. When detailed descriptions related to a well-known related function or configuration are determined to make the spirits of the present invention ambiguous, the detailed descriptions will be omitted herein. Also, terms used throughout the present specification are used to appropriately describe exemplary embodiments of the present invention, and thus may be different depending upon a user and an operator's intention, or practices of application fields of the present invention. Therefore, the terms must be defined based on descriptions made through the present invention.

'Streaming data' of the present invention includes 'real-time uncompressed-video streaming data'.

'Radio communication system' of the present invention includes a radio communication system where directional antennas for a 60 GHz band are equipped.

The radio communication system for a 60 GHz band adopting the present invention may exchange streaming data using a directional antenna located in a Light Of Sight (LOS) for the purpose of ensuring a relatively high transmission rate, and also may exchange data via another path other than in the LOS using a directional antenna. Here, 'via another path' may be realized using a relay apparatus other than a data transmitting/receiving apparatus using reflection or communication, and determining and using multiple paths may vary depending on a technical standpoint.

FIG. 1 is a block diagram illustrating a configuration of an apparatus 100 for transmitting/receiving streaming data using multiple paths according to an exemplary embodiment of the invention.

Referring to FIG. 1, the apparatus for transmitting/receiving streaming data using the multiple paths according to the present exemplary embodiment includes a path managing module 111, a data transmitting module 113, a data receiving module 121, a data verification module 123, and a restoring module 125.

The path managing module 111 manages and maintains a path list including sequence information about a transmission path capable of transmitting data. The path managing module 111 inserts information about the path list in a header part of a streaming data frame, and controls the streaming data to be transmitted via a predetermined antenna. Specifically, the path managing module 111 selects a specific path from among the transmission paths capable of transmitting data according to a predetermined rule, inserts information about the selected specific path in a frame header of the streaming data to be transmitted, and control the streaming data to be transmitted via the antenna.

The antenna may be a directional antenna, and the sequence information may include cyclic order information about at least one transmission path included in the path list, or order information based on a priority of the transmission path.

The data transmitting module 113 transmits the streaming data via an antenna selected by framing the streaming data including the sequence information. Specifically, the data transmitting module 113 transmits the streaming data to a physical layer to thereby enable the streaming data to be transmitted via the antenna determined by the path managing module 111. The data transmitting module 113 determines a sequence of line data of the streaming data when the streaming data is in a progressive mode, and transmits the streaming data via the transmission path to correspond to the sequence information. Also, the data transmitting module 113 duplicates the line data of the streaming data when the streaming data is in an interlace mode, and transmits the streaming data via at least one transmission path to correspond to the sequence information.

The data receiving module 121 receives the streaming data from metadata information included in a streaming data frame.

The data verification module 123 verifies whether the streaming data is correctly received and whether the streaming data is corrupted, and generates verification information.

The restoring module 125 restores the streaming data based on the verification information. The restoring module 125 determines whether the streaming data is corrupted based on the verification information, and interpolates corrupted line data from adjacent line data of the corrupted line data when the streaming data is partially corrupted and is also in a progressive mode according to the determined result. Conversely, the restoring module 125 restores corrupted line data from decoding information of the streaming data received via another path when the streaming data is partially corrupted and also in an interlace mode according to the determined result. Also, the restoring module 125 restores corrupted streaming data by employing a weighted average of the restored streaming data frame when the streaming data is completely corrupted according to the determined result.

Figure 2:
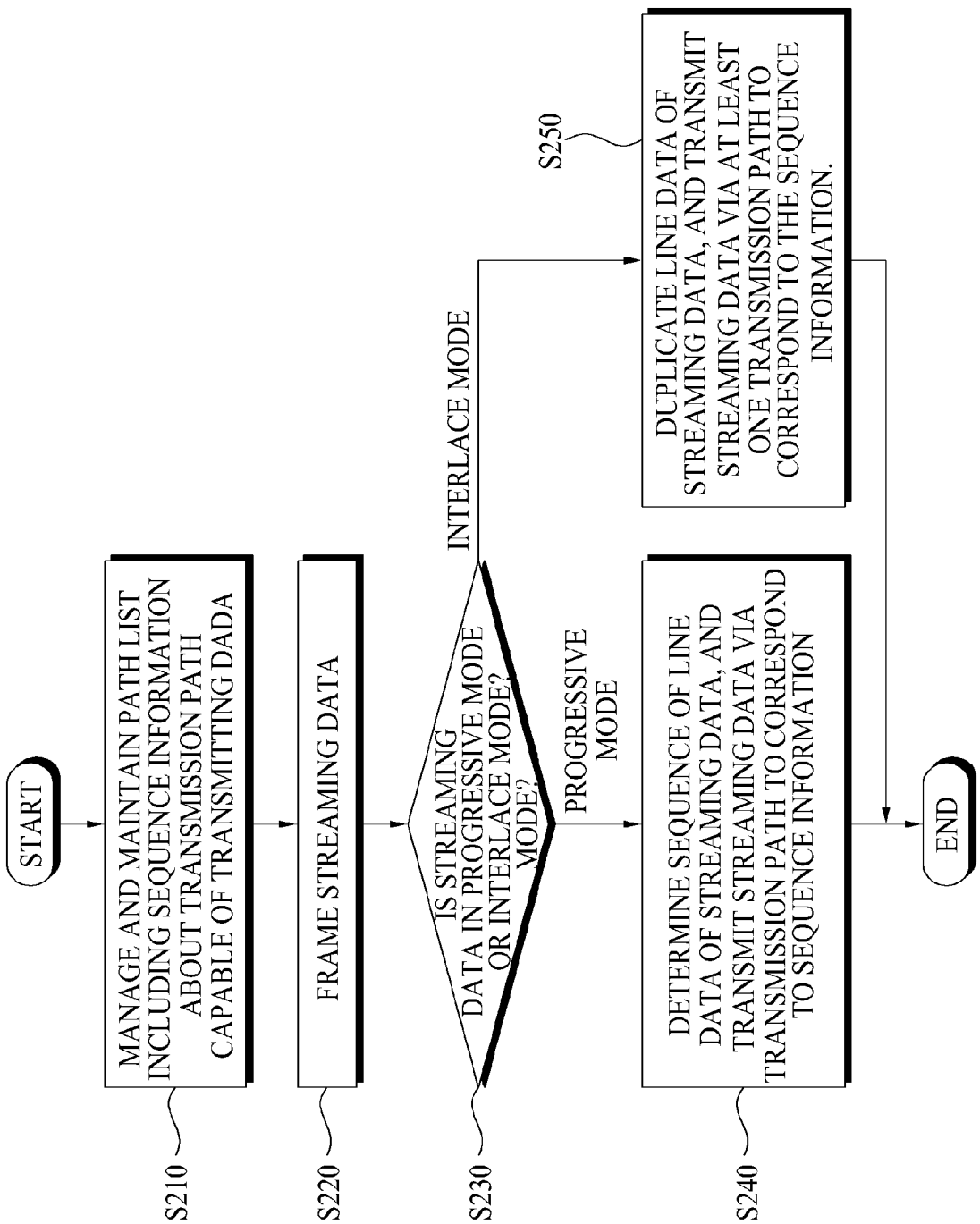
FIG. 2 is a flowchart illustrating a method for transmitting streaming data using multiple paths according to an exemplary embodiment of the invention.

FIG. 2 is a flowchart illustrating a method for transmitting streaming data using multiple paths according to an exemplary embodiment of the invention.

Referring to FIG. 2, in operation 5210, the method manages and maintains a path list including sequence information about a transmission path capable of transmitting data. In operation 5220, the method frames the streaming data.

Next, the method may transmit the streaming data frame via the multiple paths according to the sequence information. Specifically, in operation 5230, the method determines whether transmission of the streaming data frame is performed in a progressive scheme or interlace scheme. In operation 5240, the method determines a sequence of line data of the streaming data when the streaming data is in a progressive mode, and transmits the streaming data via the transmission path to correspond to the sequence information.

Conversely, in operation 5250, the method duplicates the line data of the streaming data when the streaming data is in an interlace mode, and transmits streaming data via at least one transmission path to correspond to the sequence information.

As described above, the sequence information may include cyclic order information about at least one transmission path included in the path list, or order information based on a priority of the transmission path. Specifically, the method maintains a sequence of the paths, which are used at the time of transmitting the line data, in the line data unit, and transmits the line data while cycling through the sequence of the paths. Also, a sequence or frequency of the paths for transmitting the line data is changed depending on the priority to thereby enable the line data to be transmitted. The sequence information may be inserted in metadata information of a streaming data frame header at the time of transmitting the line data based on the sequence information. The line data transmission depending on transmission schemes will be described in detail with reference to FIGS. 3 and 4.

Figure 3:
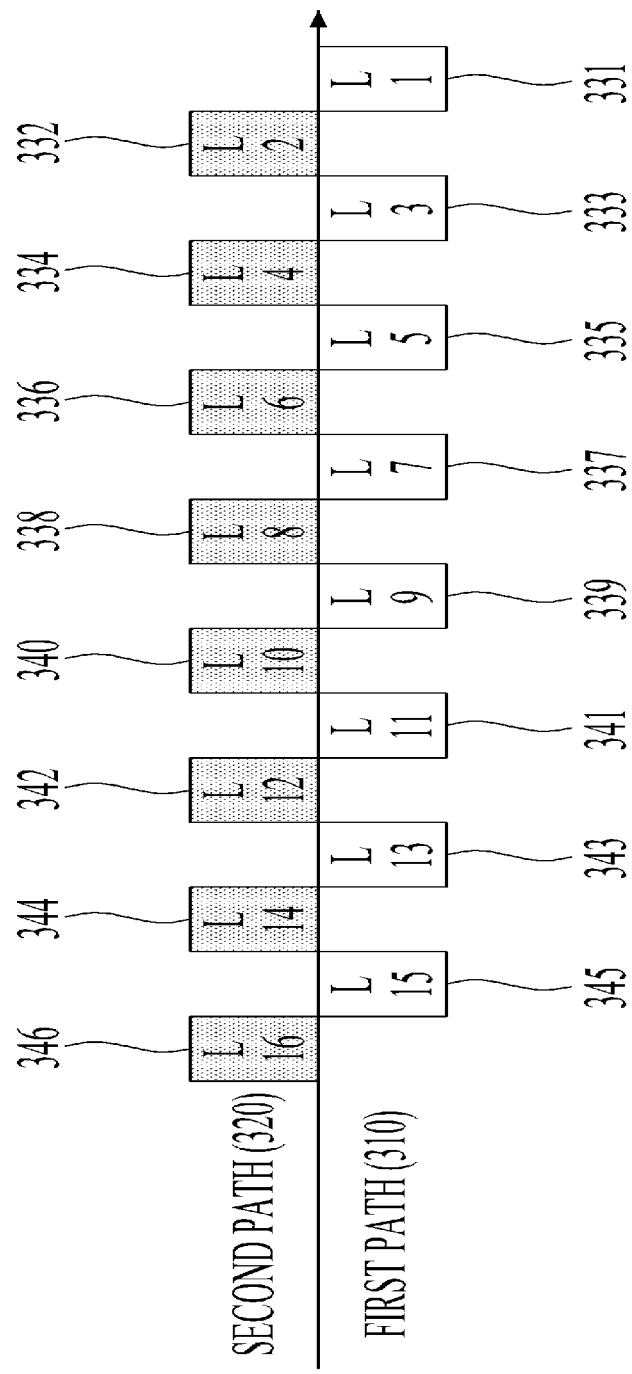
FIG. 3 illustrates a line data transmission scheme in a progressive mode according to an exemplary embodiment of the invention.
Figure 4:
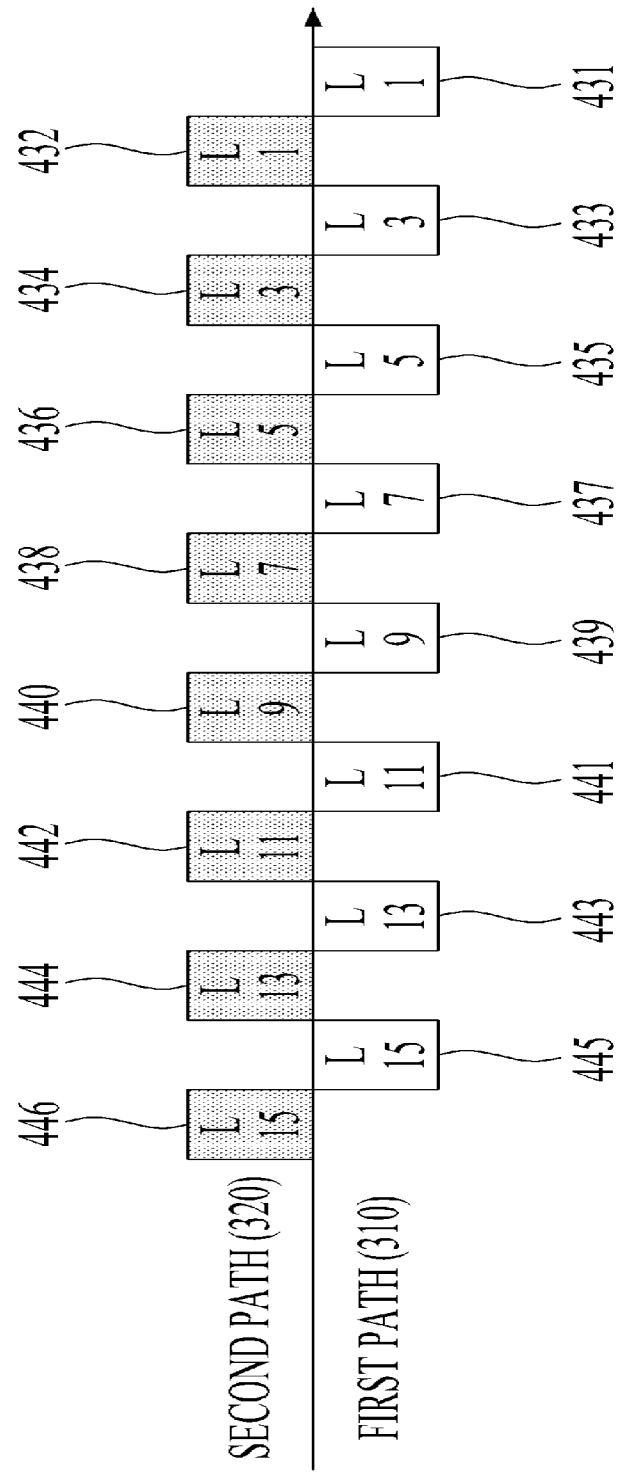
FIG. 4 illustrates a line data transmission scheme in an interlace mode according to an exemplary embodiment of the invention.

FIG. 3 illustrates a line data transmission scheme in a progressive mode according to an exemplary embodiment of the invention, and FIG. 4 illustrates a line data transmission scheme in an interlace mode according to an exemplary embodiment of the invention.

Streaming data such as image data of a receiving-end may be transmitted in a progressive scheme or an interlace scheme. The streaming data transmitted in the interlace scheme may include an odd field and an even field, so that the streaming data is respectively displayed in the odd and even fields. In this instance, the odd field and even field where a frequency is two times of a single frame may be obtained by dividing information of the streaming data, corresponding to a single frame, into two halves. Specifically, the streaming data in the interlace scheme includes, in a single frame, the odd field comprised of odd horizontal synchronization signal lines and the even field comprised of even horizontal synchronization signal lines, and the streaming data in the progressive scheme generates a single frame based on at least one of the odd field and the even field to thereby generate the streaming data.

Referring to FIG. 3, first line data 331, 333, 335, 337, 339, 341, 343, and 345 is transmitted via a first path 310, and second line data 332, 334, 336, 338, 340, 342, 344, and 346 is transmitted via a second path 320. Also, when it is assumed that only the first path 310 and the second path 320 of the multiple paths in FIG. 3 exist, data starting from third line data is transmitted alternatively via the first and second path 310 and 320. Also, when it is assumed that a third path exists, data may be transmitted alternatively via the first, second, and third paths. According to the streaming data transmission schemes using the multiple paths of the present invention, the transmission path is repeatedly changed, so that deterioration in qualities of the streaming data such as bodily sensational picture quality in the receiving end may be reduced.

Referring to FIG. 4, in the interlace scheme where the streaming data is divided into an odd field and an even field and the odd field and the even field are injected at times different from each other, adjacent line data has respectively different fields, and times for acquiring the line data are different from each other. As a result, when the data transmission scheme in the progressive mode is adopted as shown in FIG. 3, qualities in streaming data such as the picture quality may be deteriorated at the time of restoring in the receiving-end. Therefore, in the data transmission scheme in the interlace mode according to the present exemplary embodiment of the invention, an order of the line data of the streaming data is determined to correspond to the sequence information, and the line data is repeatedly transmitted via multiple paths, for example, via a first path 410 and a second path 420. In this instance, the line data is repeatedly transmitted until the transmission of the line data of the streaming data is terminated. Also, an order of the transmission paths is changed when the subsequence streaming data is transmitted after transmission of the single streaming data is terminated. This is for the purpose of preventing repeated interruption of the line data classified to be transmitted to an interrupted channel when a length of the interruption of the transmission channel is extended more than the streaming data. Specifically, the transmission channel is repeatedly changed, so that deterioration in qualities of the streaming data such as bodily sensational picture quality in the receiving end may be reduced even though the transmission of the streaming data is impossible due to interruption of any one channel.

In the data transmission scheme using the multiple paths as described in FIGS. 3 and 4, when the system adopting the present invention has a capability for processing multi-path signals such as Orthogonal Frequency Division Multiplexing (OFDM) technology at the time of transmitting the same line data via paths different from each other, the line data may be transmitted even in the same time slot.

Figure 5:
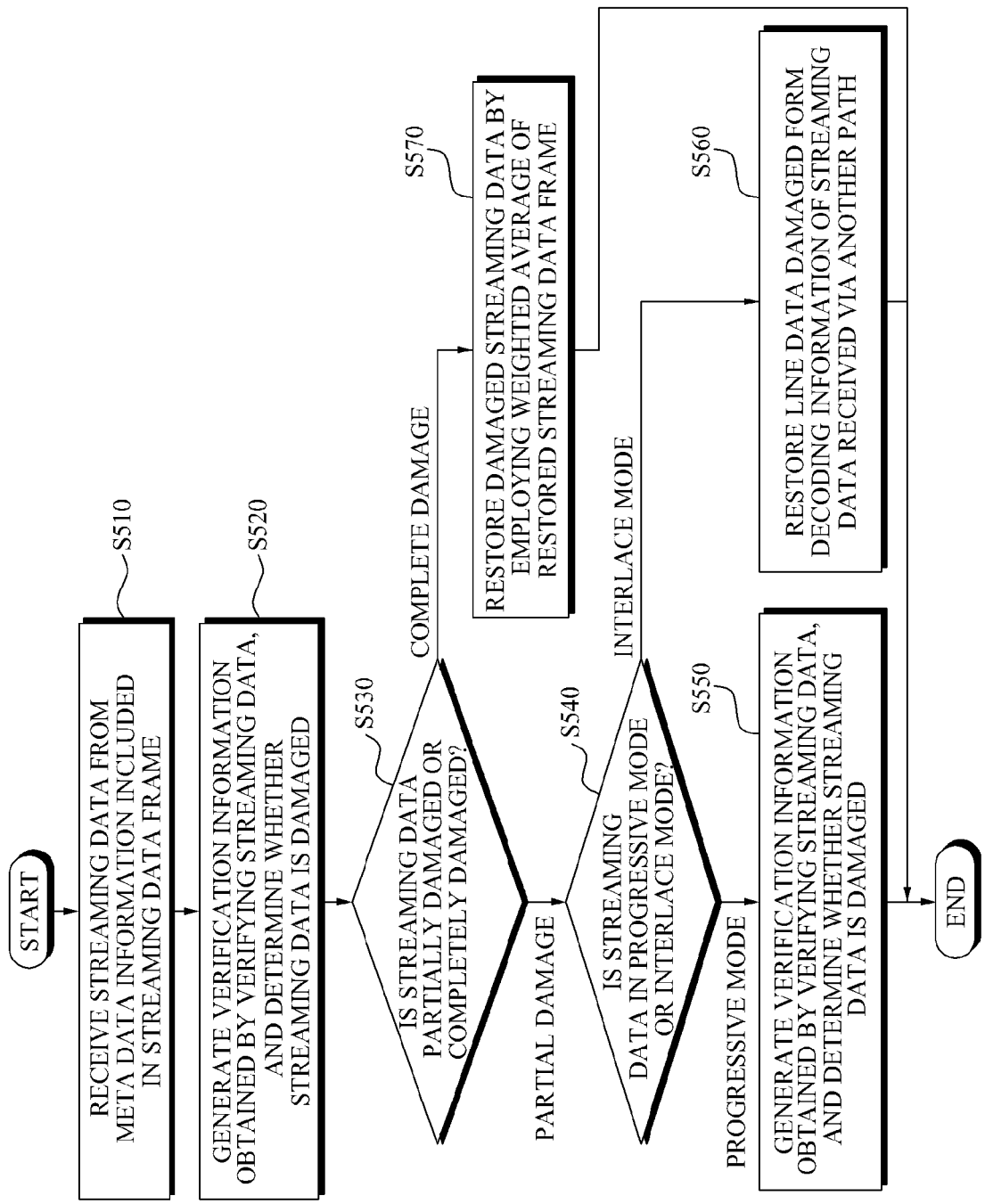
FIG. 5 is a flowchart illustrating a method for receiving streaming data using multiple paths according to an exemplary embodiment of the invention.

FIG. 5 is a flowchart illustrating a method for receiving streaming data using multiple paths according to an exemplary embodiment of the invention, Referring to FIG. 5, in operation S510, the method receives a streaming data frame, and collects the streaming data from the received streaming data frame. More specifically, the method collects the streaming data from metadata information included in the streaming data frame.

Next, in operation S520, the method generates verification information obtained by verifying the collected streaming data. In operation S530, the method determines whether the streaming data is partially or completely corrupted so as to restore the streaming data based on the verification information. The method interpolates corrupted line data from adjacent line data of the corrupted line data when the streaming data is partially corrupted in operation S530 and is also in a progressive mode in operation S540 according to the determined result. In operation S560, the method restores corrupted line data from decoding information of the streaming data received via another path when the streaming data is partially corrupted in operation S530 and is also in the interlace mode in operation S540 according to the determined result.

In operation S570, the method restores corrupted streaming data by employing a weighted average of the restored streaming data frame when the streaming data is completely corrupted in operation S530 according to the determined result.

The method for transmitting/receiving streaming data using multiple paths according to the above-described exemplary embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

As described above, according to the present invention, there is the apparatus for transmitting/receiving streaming data using multiple paths which may, via the multiple paths, prevent the real-time streaming data exchange from being discontinued even though people or obstacles exist in the LOS.

According to the present invention, there is the apparatus for transmitting/receiving streaming data using multiple paths which may reproduce the streaming data while preventing the streaming data from being interrupted without separate control signals even in the radio communication system using the directional antenna.

According to the present invention, there is the apparatus for transmitting/receiving streaming data using multiple paths which may restore even corrupted streaming data at the time of exchange of the streaming data via the multiple paths.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method for transmitting data using a plurality of transmission paths capable of transmitting the data, the method comprising:
    obtaining sequence information of the plurality of transmission paths including a first transmission path in a Line Of Sight (LOS) and a second transmission path using a relay apparatus, the second transmission path being different from the first transmission path, wherein the sequence information include cyclic order information of at least one transmission path in the plurality of transmission paths;
    selecting, based on the obtained sequence information, the plurality of transmission paths one after another in a circular manner;
    framing the data; and
    transmitting the framed data via the selected transmission paths corresponding to the obtained sequence information, using a first directional antenna for the LOS when the first transmission path is selected and using a second directional antenna for the relay apparatus when the second transmission path is selected,
    wherein the selecting the plurality of transmission paths includes changing a selected transmission path iteratively between the first transmission path and the second transmission path.

2. The method of claim 1, wherein the data include streaming data.

3. The method of claim 2, wherein the streaming data is in at least one of a progressive mode and an interlace mode.

4. A method for receiving data using a plurality of transmission paths, the method comprising:
    receiving pieces of a data frame from the plurality of transmission paths, one transmission path after another in a circular manner, which include a first transmission path in a Line Of Sight (LOS) and a second transmission path using a relay apparatus, and collecting the data from the received pieces of the data frame; and
    generating verification information by verifying the collected data, determining whether the collected data is corrupted, and when the collected data is determined to be partially corrupted, restoring the corrupted data based on the verification information, wherein the restoring includes
        determining whether the collected data is in a progressive mode or in an interlace mode, and
            if the collected data is determined to be in the progressive mode, interpolating a corrupted piece of the collected data using pieces of the collected data adjacent to the corrupted piece, and
            if the collected data is determined to be in the interlace mode, restoring a corrupted piece of the collected data using an uncorrupted duplicate of the corrupted piece received via another one of the transmission paths.

5. The method of claim 4, wherein the collecting the data includes collecting the data from metadata information included in the data frame.

6. The method of claim 4, wherein the restoring includes restoring the corrupted data by employing a weighted average of restored data frame when the collected data is determined to be completely corrupted.

7. An apparatus for transmitting and receiving data using a plurality of transmission paths, the apparatus comprising:
    a processor;
    a memory containing instructions embodied in a plurality of modules which, when executed on the processor, causes the processor to perform the instructions, the plurality of modules comprising:
        a path managing module to obtain information of the plurality of transmission paths including a first transmission path in a Line Of Sight (LOS) and a second transmission path using a relay apparatus, the second transmission path being different from the first transmission path;
        a data transmitting module to frame the data, and to transmit pieces of the framed data via the plurality of transmission paths, the data transmitting module being configured to determine whether the data is to be transmitted in a progressive mode or in an interlace mode, and
            if the data is determined to be transmitted in the progressive mode, determine a sequence of the framed data, and transmit pieces of the sequence of the framed data via the plurality of transmission paths, and
            if the data is determined to be transmitted in the interlace mode, duplicate the framed data, and transmit pieces of the duplicated framed data via the plurality of transmission paths,
        wherein each piece is transmitted by a selected one of the plurality of transmission paths, the plurality of transmission paths being selected one after another in a circular manner;
        a data receiving module to alternatively receive pieces of the framed data from the plurality of transmission paths, and to collect the data from metadata information included in the framed data;
        a data verifying module to verify whether the collected data is correctly received and whether the collected data is corrupted, and to generate verification information; and
        a restoring module to restore the data based on the verification information.

8. The apparatus of claim 7, wherein the path managing module controls the data to be transmitted via an antenna.

9. The apparatus of claim 8, wherein the antenna is a directional antenna.

10. The apparatus of claim 7, wherein the information includes cyclic order information about at least one transmission path of the plurality of transmission paths.

11. The apparatus of claim 7, wherein the information includes order information based on a priority of the plurality of transmission paths.

12. The apparatus of claim 7, wherein the restoring module is configured to
    determine whether the collected data is in a progressive mode or in an interlace mode, and
        if the collected data is determined to be in the progressive mode, interpolate a corrupted piece of the collected data using pieces of the collected data adjacent to the corrupted piece, and if the collected data is determined to be in the interlace mode, restore a corrupted piece of the collected data using an uncorrupted duplicate of the corrupted piece received via another one of the transmission paths.

13. The method of claim 1, wherein the LOS is formed for a 60 GHz band.

\* \* \* \* \*